Dec. 9, 1952

F. H. PIETZSCH 2,621,062

BRAKE ROD AND JAW ASSEMBLY

Filed May 4, 1949

2 SHEETS—SHEET 1

INVENTOR:
Frank H. Pietzsch,
by Carr & Carr Gravely,
HIS ATTORNEYS.

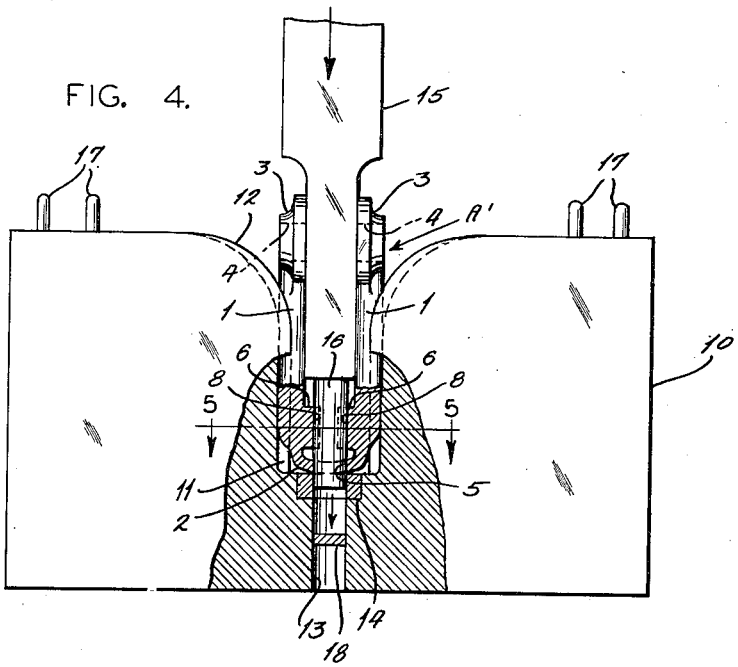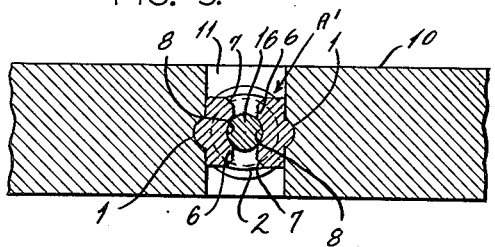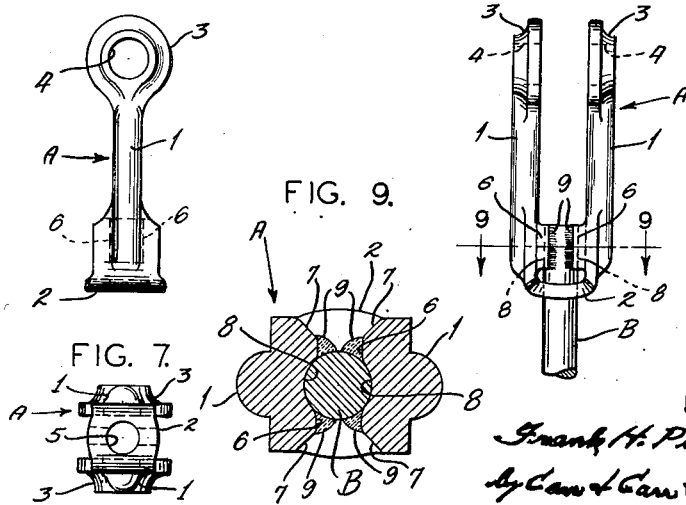

Patented Dec. 9, 1952

2,621,062

UNITED STATES PATENT OFFICE 2,621,062

BRAKE ROD AND JAW ASSEMBLY

Frank H. Pietzsch, Clayton, Mo., assignor to Western Railway Equipment Company, St. Louis, Mo., a corporation of Missouri Application May 4, 1949, Serial No. 91,274

3 Claims. (Cl. 287—20.2)

This invention relates to rod and jaw assemblies, particularly railway car brake rod and jaw assemblies, wherein the brake rod is secured to the closed inner end of the jaw in longitudinal alignment therewith and the ends of the branches of the jaw are perforated to receive a brake pin.

The object of the invention is to simplify the operation of forming the brake jaw and to provide for quickly and easily positioning the brake rod in said jaw and for rigidly securing it thereto. The invention consists in providing the closed inner end of the brake jaw with an opening adapted to receive the brake rod and in providing the inner sides of branches of said jaw member with opposed longitudinal grooves adapted to snugly receive, support and accurately position the end of the brake rod in axial alignment with said opening; and it also consists in welding the brake rod to said branches along opposite sides of said grooves. The invention also consists in the process of shaping the jaw and in securing the brake rod therein.

Figure 1:
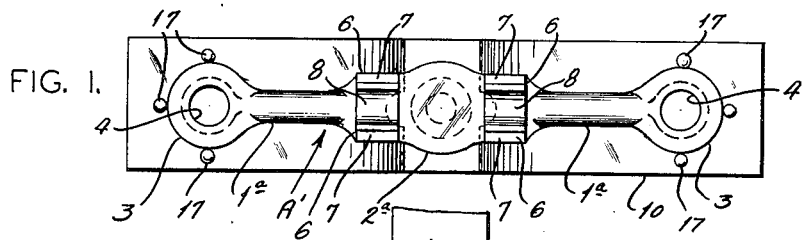
Figure 2:
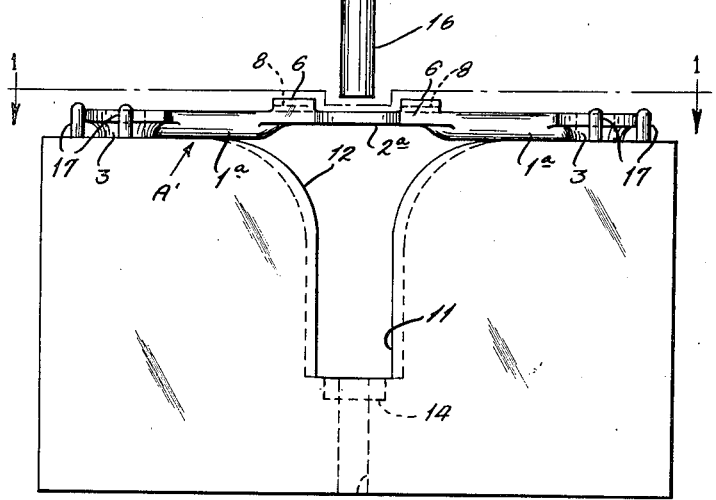

In the accompanying drawings, which form part of this specification and wherein like symbols refer to like parts wherever they occur, Fig. 1 is a top plan view, showing the blank from which the brake jaw is formed seated on a forming die therefor, Fig. 2 is a side elevational view of the blank and the die shown in Fig. 1, with the vertical movable shaping and punching plunger in position to engage the blank.

Figure 3:
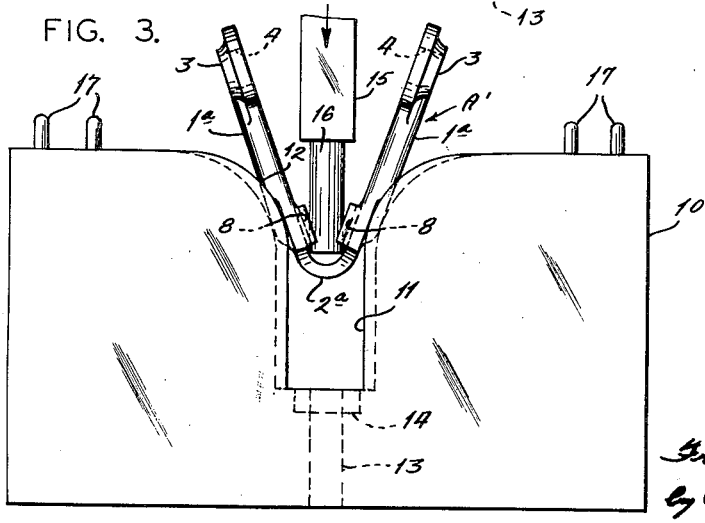

Fig. 3 is a view similar to Fig. 2, showing the partially formed brake jaw,

Fig. 4 is a view similar to Fig. 3 showing the completely formed brake jaw with the brake rod receiving hole punched in the closed inner end thereof, Fig. 5 is a fragmentary horizontal cross-sectional view on the line 5—5 in Fig. 4, Fig. 6 is a side elevational view of the finished brake jaw, Fig. 7 is an end elevational view of the brake jaw looking from the inner end thereof, Fig. 8 is a side elevational view of the finished brake rod and jaw assembly; and Fig. 9 is an enlarged cross-sectional view through said assembly on the line 9—9 in Fig. 8.

My brake rod and jaw assembly comprises a metal brake jaw or clevis A and a metal brake rod B. The U-shaped brake jaw comprises two spaced parallel branches 1 integrally connected at one end by a curved portion 2 and having enlarged circular free end portions 3 with central circular brake pin receiving holes or openings 4 extending therethrough. The closed end portion 2 of the brake jaw A has a central circular brake rod receiving hole or opening 5 extending therethrough longitudinally of said brake jaw; and the branches 1 of said brake jaw have opposed duplicate rectangular projections 6 formed on their inner faces adjacent to the closed end 2 of said brake jaw. These rectangular lugs or projections 6 preferably extend the full width of the branches 1 and are beveled, as at 7, along the longitudinal edges thereof. The projections 6 have relatively shallow, oppositely disposed, round-bottomed grooves 8 formed in their opposing faces and extending longitudinally of said branches midway of the width thereof. Each of the grooves 8 has a radius of curvature corresponding to the radius of the brake rod receiving hole 5 and is concentric therewith.

The cylindrical brake rod B has a snug fit in and extends through the opening 5 in the closed end 2 of the brake jaw and into the space between the branches 1 of said jaw and snugly seats in the round-bottomed grooves 8 in the rectangular projections 6 on the inner faces of said branches. The brake rod B is secured in such position by means of four welds 9 that extend the full length of the opposed rod supporting projections 6 along the beveled edges 7 thereof.

By the arrangement described, the end of the brake rod B may be quickly and easily inserted in the opening 5 in the closed end 2 of the brake jaw A and seated in the longitudinal grooves 8 provided therefor in the inner faces of the branches 1 of said jaw, thus accurately holding the brake rod in position in the brake jaw during the operation of welding the rod in place. The brake rod B is rigidly secured in the brake jaw by means of the four longitudinal welds 9 which are spaced apart circumferentially of the rod and are located in readily accessible substantially V-shaped grooves formed by the adjacent faces of the rod and the inner beveled edges of the projections 6 in which the rod positioning grooves 8 are formed.

As shown in Figs. 1 and 2, the brake jaw A is made from a forged flat blank A' having a middle portion 2a, which forms the closed end 2 of the jaw, and oppositely extending end portions 1a, which form the branches 1 of the jaw and have the brake pin holes 4 punched in their enlarged outer ends 3, and the grooved rod supporting projections 6 formed near their inner ends. The flat brake jaw blank A' is then hot-formed in a die 10 having an upwardly opening flat-sided cross groove 11 having a flared mouth portion 12 formed by rounding the upper corners of said groove. The die block 10 has a passageway 13 that leads downwardly from the bottom of the groove 11 therein and opens through the bottom of said block; and the upper end portion of this passageway is counterbored to receive a removable die ring insert 14. The brake jaw bending apparatus also includes a vertical movable flat-sided plunger 15 which terminates at its lower end in a cylindrical punch portion 16 that is disposed in axial alignment with the die ring insert 14 and is adapted to enter the hole therein near the end of the downward travel of said plunger.

In the operation of forming the brake jaw A from the blank A', the blank is heated to the desired forging temperature and then placed crosswise of the forming groove 11 with its middle portion 2a located directly thereabove and with its end portions 1a supported on the upper face of the die block 10 and held in the desired horizontal position thereon by means of portioning pins 17 that project upwardly from said die block at the ends and on opposite sides of the enlarged end portions 3 of the blank. The plunger 15 is then moved downwardly into engagement with the unsupported middle portion 2a of the blank A', thereby forcing the blank downwardly into the groove 11 of the die block 10 and thereby causing the two branch forming portions 1a of the blank to swing upwardly toward each other until they are positioned vertically between the side walls of the groove 11 and the flat side faces of the plunger 15. Further down travel of the plunger 15 causes the punch portion 16 at the lower end thereof to pass through the closed lower end 2 of the brake jaw and punch the brake rod receiving hole 5 therein, the punch-out 18 resulting from the hole punching operation falling through the passageway 13 in the die block.

During the downward travel of the plunger 15 the punch portion thereof passes through the opposed brake rod positioning grooves 8 in the properly positioned branches 1 and maintains or gives said grooves their proper final shape. The brake rod supporting grooves 8 of the blank are forged to fit the smallest size brake rod, and the shape of said grooves is maintained during the bending operation by using a punch 16 having a diameter corresponding substantially to the diameter of the small size rod. For larger sized rods, a larger size punch and die ring insert are employed and the excess metal in the rod seats 6 is squeezed between the punch and the vertical wall of the groove 11 in the die block 10 to form a rod supporting groove whose radius of curvature corresponds substantially to the radius of the larger rod. By this arrangement the same blank, die block and plunger may be used in forming brake jaws having supporting grooves and holes for brake rods of different diameters merely by using punches and die ring inserts of different diameters.

What I claim is:

1. A brake jaw comprising spaced branches and an end web portion connecting said branches and having a circular rod receiving opening therethrough, said branches having oppositely disposed projections formed on the inner faces of the branches, with the projections having opposed longitudinal extending, transversely concave grooves in the opposing faces of said projections, said grooves being concentric with said circular opening and having a radius of curvature corresponding substantially to the radius of said opening, and being adapted to receive and support a rod between said branches.

2. An assembly comprising a brake rod and a brake jaw including spaced branches and an end portion connecting said branches and having an opening through which said rod extends between said branches, said rod and rod receiving opening being circular, oppositely disposed projections formed on the inner faces of said branches, said projections having opposed longitudinal extending transversely concave grooves in their inner faces adapted to receive and support said rod, said grooves being concentric with said circular opening and having a radius of curvature corresponding substantially to the radius of said circular opening, and means for permanently securing said rod in said grooves.

3. The combination set forth in claim 2 wherein the means for securing said rod in said grooves comprises welds extending along said rod and projections on opposite sides of said grooves.

FRANK H. PIETZSCH.

REFERENCES CITED

The following references are of record in the file of this patent:

UNITED STATES PATENTS

| Number | Name | Date |
|---|---|---|
| 1,133,874 | Mirtz | Mar. 30, 1915 |
| 1,347,137 | Weaver | July 20, 1920 |
| 1,553,060 | Anderson | Sept. 8, 1925 |
| 1,567,351 | Whitney | Dec. 29, 1925 |
| 1,886,128 | Small | Nov. 1, 1932 |
| 1,903,863 | Hayden | Apr. 18, 1933 |
| 2,192,014 | Muchnic | Feb. 27, 1940 |